(12) United States Patent
Meissner et al.

(10) Patent No.: US 8,498,536 B2
(45) Date of Patent: Jul. 30, 2013

(54) DISPERSION MEASUREMENT OF OPTICAL FIBRES DURING OPERATION

(75) Inventors: Peter Meissner, Reinheim (DE); Michael Bousonville, Mainz (DE)

(73) Assignee: GSI Helmholtzzentrum für Schwerionenforschung GmbH, Darmstadt (DE)

(*) Notice: Subject to any disclaimer, the term of this patent is extended or adjusted under 35 U.S.C. 154(b) by 120 days.

(21) Appl. No.: 12/920,329

(22) PCT Filed: Mar. 4, 2009

(86) PCT No.: PCT/EP2009/001522
§ 371 (c)(1),
(2), (4) Date: Dec. 10, 2010

(87) PCT Pub. No.: WO2009/109365
PCT Pub. Date: Sep. 11, 2009

(65) Prior Publication Data
US 2011/0158655 A1 Jun. 30, 2011

(30) Foreign Application Priority Data
Mar. 6, 2008 (DE) .......................... 10 2008 012 982

(51) Int. Cl.
*H04B 10/08* (2006.01)

(52) U.S. Cl.
USPC .............................. 398/29; 398/195; 356/73.1

(58) Field of Classification Search
None
See application file for complete search history.

(56) References Cited

U.S. PATENT DOCUMENTS

| | | | |
|---|---|---|---|
| 4,320,475 A * | 3/1982 | Leclerc et al. | 367/149 |
| 2003/0071985 A1 * | 4/2003 | Mori et al. | 356/73.1 |
| 2006/0132793 A1 * | 6/2006 | Ogawa | 356/484 |

* cited by examiner

*Primary Examiner* — Kenneth N Vanderpuye
*Assistant Examiner* — David Lambert
(74) *Attorney, Agent, or Firm* — Reising Ethington PC

(57) ABSTRACT

The invention at hand concerns a method and a system for transmitting data in an optical transmission system. A measuring signal is generated having a wavelength which differs from the wavelengths of a data signal that includes the data to be transmitted. The measuring signal is coupled in the optical transmission system, reflected after passing through the transmission path and decoupled again. The coupled measuring signal is compared with the decoupled reflected measuring signal. By taking into account the comparison results, a compensation of the change of the data signal resulting from the dispersion in the fiber is performed in such a way that the data included in the data signal can be used.

18 Claims, 3 Drawing Sheets

DISPERSION MEASUREMENT OF OPTICAL FIBRES DURING OPERATION

DESCRIPTION OF THE INVENTION

The invention at hand concerns a method and a system for improving data transmission in an optical transmission system.

BACKGROUND OF THE INVENTION

With today's glass fiber technology, it is possible to transmit volumes of data or information in optical transmission systems with approximately 10 Gbit/s. The special advantages of optical transmission are a low transmission loss and insensitivity to electromagnetic interferences. The basis for optical communication is essentially formed by light generating transmitter oscillators for example, internally or externally modulated laser diodes, the fiber and the receiver, for example photo diodes, possibly with amplifiers. For the transmission of large volumes of data, especially the DWDM (Dense Wavelength Division Multiplex) has become established. DWDM makes it possible to transmit simultaneously many wavelengths of light via a mutual (or one) fiber glass. For this purpose, several signals are combined or bundled for the transmission of signals and information and transmitted essentially simultaneously via a line.

The maximum line length for data rates of 10 Gbit/s is in the range of 100 km and, among other things, limited by fiber attenuation. In addition to fiber attenuation, the dispersion of the fiber material becomes noticeable, especially if large transmission paths are involved. This results in a dispersion of the group velocity of the individual wavelengths of light. The extremely short light pulses of a high speed signal of approximately 10 Gbit/s correspond with a certain spectral width, which results in pulse broadening of the temporal signal, especially also during low dispersion.

The attenuation and dispersion effects, as well as linear and non-linear effects reduce the transmission of high signal rates. However, to allow for a transmission of large volumes of data (currently, optical data transmissions with rates of up to approximately 100 Gbit/s are being tested), it is required to know or compensate interferences (or disturbances) that affect transmission.

Currently, among other things, attempts have been made to compensate the dispersion by counteracting opposing dispersion with optical elements. Typically this involves appropriately designed and integrated fiber portions. Since this is some kind of "static" compensation, as it were, it is not possible to record, for example, time-dependent or "dynamic," such as thermic and/or mechanical, changes of the transmission path. As a result, when using data rates of 40 Gbit/s, it is necessary to perform additional active dispersion compensation for fine tuning. In order to perform this fine tuning correctly, the actual dispersion or change of dispersion has to be known.

GENERAL DESCRIPTION OF THE INVENTION

Against this background, the invention at hand has the objective of providing a method and a system for transmitting information or data in an optical transmission system which at least reduces the previously described disadvantages of prior art.

In this regard, it should be especially possible to perform a reliable measurement of the transmission parameters of an optical fiber, as, for example, the dispersion or a change of dispersion, preferably also in already existing data transmission systems.

In particular, it should be possible to perform a measurement of the dispersion or a change of dispersion while the optical data transmission system is in operation.

These problems are solved by the method and system described in the independent claims. Advantageous embodiments are the subject matter of the respective sub-claims.

In a first embodiment, the invention at hand claims a method for transmitting data or information in an optical transmission system from a first place to a second place, which transmission system has at least a light generating transmitter, a transmission path having at least one fiber and one receiver, and comprises the following procedural steps:

Generating a measuring signal of at least one wavelength which differs from the wavelengths of a data signal that includes the data to be transmitted, Coupling the measuring signal in at least one fiber of the optical transmission system, Providing means or a reflector for wavelength-selective reflection, allowing the measuring signal to be reflected after passing through the fiber portion, Decoupling the reflected measuring signal from the fiber, Comparing or processing the coupled transmitted measuring signal and the decoupled reflected measuring signal, and At least determining the dispersion in the fiber by comparing the coupled measuring signals and the decoupled reflected measuring signals.

In one embodiment the method is characterized by a compensation of the change of the data signal that occurred at least as a result of the dispersion taking place in the fiber, taking account of the comparison or processing in such a way that the data included in the data signal can be used.

The invention at hand provides also a system for integrating in or complementing an optical data transmission system, which has at least one light-generating sender, a transmission path with at least one fiber and one receiver, for compensating the dispersion, comprising the following components:

A device for providing a measuring signal of at least one wavelength, which differs from the wavelengths of the data signal that include the information to be transmitted, A coupling device for coupling the measuring signal in at least one fiber of the optical transmission system, A reflector for wavelength-selective reflection, allowing the measuring signal to be reflected after passing through the fiber portion, A coupling device for decoupling the reflected measuring signal from the fiber, A receiving device for receiving the decoupled reflected measuring signal, Means or a device for comparing coupled measuring signals and decoupled reflected measuring signals and/or for determining the dispersion.

In one embodiment the system is characterized by means or a device for compensating the change of the data signal that occurred at least as a result of the dispersion, taking account of the comparison in such a way that the data included in the data signal can be used.

The system is especially embodied to perform the invention-based method. Preferably, the method is embodied in such a way that it can be performed by means of the invention-based system.

The dispersion taking place in the transmission path of the data signal is being determined. The objective of the dispersion compensation is to compensate the signal distortion at the receiver occurring in the transmission path because of path dispersion in such a way that the transmitted data can be processed, preferably also received, with adequate quality. The modular character of the system makes it possible to complement or integrate the available system, for example in the form of a kit, in already existing optical data transmission systems. The invention at hand provides especially the possibility of fine tuning to a certain degree the transmission path. For this purpose, it is even possible to use standard components, which are essentially only optical components. Subsequently, the data and the data signal are also depicted as information or information signal. The data signal is used to transmit the information of data. For this purpose, the data signal can have only one signal of a wavelength. Preferably, the data signal consists of several WDM signals. The data signal comprises several WDM signals with different optical wavelengths that are combined. Preferably, the wavelengths are in the range of the communication wavelengths in the known C-Band or L-Band. The data signal includes the information to be transmitted. A usable data signal is a signal from which the information to be transmitted is extracted after the transmission, preferably essentially complete.

The measuring signal can be configured or designed as a continuous pulse. Preferably, it is a signal which does not, or does not essentially, have the function of transmitting information. It is used exclusively or essentially for measuring or characterizing the optical fiber or the fiber bundle. The optical wavelength of the measuring signal differs from the optical wavelengths of the information signal in that this can be separated respectively from the information signal. The minimal distance to the wavelengths of the information signal amounts to approximately 1.6 nm.

If the measuring signal is provided only with one optical wavelength, it is preferably possible to observe or determine a direct change of the fiber, in particular a change of the dispersion.

If, for example, the dispersion should be determined directly, the measuring signal is provided with at least two different wavelengths. This is of special advantage if the fiber is measured for the first time. Therefore, the device for providing the measuring signal is designed in such a way that it can provide at least two different optical wavelengths. Preferably, the device for providing the measuring signal comprises a laser.

In general, the measuring signal is provided with a modulation frequency $f_{measurement}$. The modulation can take place already internally in a laser. If, for example through a CW laser, the measuring signal is provided essentially in constant amplitude and frequency or is to be further modulated, the device for providing the measuring signal comprises preferably a frequency-variable modulator.

The initial modulation frequency $f_{measurement}$ of the measuring signal is adjusted to the length of the fiber. The initial frequency describes the frequency by means of which a first "rough" measurement of the run time (or propagation time) is performed. The initial modulation frequency $f_{measurement}$ is adjusted to the marginal condition of $1/f_{measurement}$ larger than approximately double the run time of the measuring signal. The modulation frequency of the measuring signal is increased for improving the accuracy of resolution (or resolving power), preferably in discreet steps. During operation the modulation frequency of the measuring signal is essentially kept constant.

Preferably, before being coupled in the fiber, the generated measuring signal is separated in at least two components by means of a divider for separating the measuring signal, a first portion is coupled in the fiber and a second portion is provided for comparing the coupled portion with the reflected portion.

In one embodiment, the coupling device for coupling or connecting the measuring signal in the fiber comprises a multiplexer.

Then the coupled signal is directed over the portion of the line to be measured or controlled. At the end of the portion, the measuring signal is reflected at the reflector. In this connection, the measuring signal can be reflected essentially completely or reflected only partially. Preferably, the reflector is a Fiber-Bragg-Grating or the reflector comprises a Fiber-Bragg-Grating.

Then the measuring signal returns, preferably essentially along the entire transmission path and is decoupled from the line by means of the coupling device for decoupling the measuring signal. Preferably, the coupling device for decoupling the measuring signal comprises a demultiplexer or the coupling device for decoupling the measuring signal is a demultiplexer.

In one embodiment the coupling device for coupling the measuring signal and the coupling device for decoupling the measuring signal are arranged in one component or are provided by means of one component. Preferably, the coupling device for coupling the measuring signal and the coupling device for decoupling the measuring signal is an ADD/DROP multiplexer.

According to one embodiment, the provided measuring signal and the decoupled measuring signal are supplied to the coupling device or the receiving device respectively via a switch, which is designed especially as a circulator.

The receiving device or receiver is designed to receive the reflected measuring signal. However, it can comprise also means for comparing the coupled measuring signal with the decoupled measuring signal. These means for making comparisons can also be arranged in a separate component. In detail the means for making comparisons can be designed to compare the phase of the coupled measuring signal with the phase of the decoupled measuring signal and/or to determine the run time.

From the previously mentioned comparison the run time of the measuring signal can be determined. It is therefore preferred that the receiving device is designed for determining the run time. In one embodiment, the receiving device is assigned to a network analyzer. The receiving device can also be a component of a measuring device which, in one embodiment, comprises also a network analyzer. The functions generating the measuring signal and/or separating the measuring signal and/or transmitting the measuring signal and/or providing the measuring signal and/or receiving the measuring signal and/or comparing and/or determining the run time and/or the dispersion can be provided by means of a measuring device or a network analyzer.

The dispersion is determined by means of the different wavelengths of the measuring signal or from the run times of the different wavelengths. As previously described, it is preferred that the phase of the coupled measuring signal is compared with the phase of the decoupled signal in order to determine the run time or the dispersion. However, the comparison can involve also that the transmitted signal is simply used as a starting signal for a time measurement and the reflected signal is used as a stop.

The signal distortion resulting from path dispersion or change of dispersion should be compensated in such a way that the transmitted data can be received and/or processed in adequate quality.

In one embodiment, before the information signal is received by the receiving device, preferably before coupling the information signal in the fiber or before transmission in the fiber of the optical transmission device takes place, the information signal is adjusted or prepared in such a way that a change of the information signal resulting from the transmission is essentially compensated. In this connection, the signal can be prepared directly and/or adjusted by means of a respective preparation of the transmission path. For this purpose, a dispersion compensation module with respective opposing dispersion, preferably a so-called compensating fiber is integrated, for example in the optical path. However, it is also possible to stretch or compress and/or thermally treat a portion of the fiber to prepare the transmission path.

In an alternative or complementary embodiment, after transmission, the information signal is adjusted or regenerated in such a way that a change of the information signal resulting from the transmission is essentially compensated. Regeneration can involve re-amplification and/or re-shaping and/or re-timing. Respective means or devices have been provided to perform the preparation or regeneration. In one embodiment of the invention the means for compensating has been arranged in beam direction after the coupling device for coupling and/or after the coupling device for decoupling.

In a preferred embodiment, the method according to the invention, especially the measuring of the fibers or determining of the dispersion, is performed quasi continuously or continuously, allowing for an essentially permanent or continuous control of the transmission system.

Furthermore, the scope of the invention at hand involves also an optical data transmission system having at least one of the systems described above.

In general, the signals carrying the information or data are amplified after a certain line length, at least as a result of the attenuation of the signal. This preparation or amplification of the signals generally takes place in so-called transmission stations. Therefore, in a respective embodiment, the optical data transmission system is characterized in that at least one system according to the invention at hand is arranged or integrated in one or essentially in each transmission station.

The following embodiments provide a detailed description of the invention at hand. In this regard, reference is made to the enclosed drawings. The corresponding parts in the individual drawings are provided with corresponding reference numerals.

DETAILED DESCRIPTION OF THE INVENTION

Figure 1:
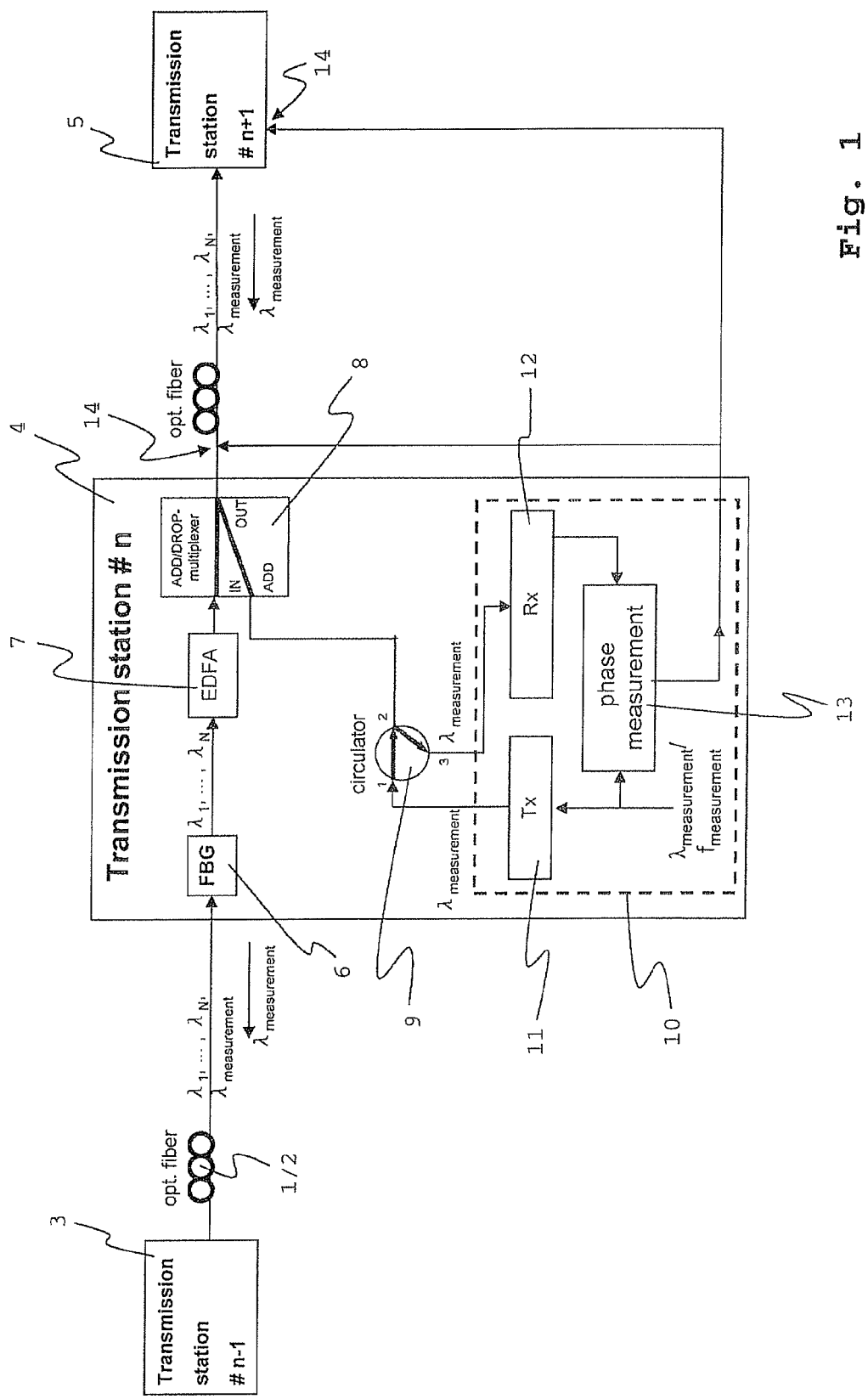
FIG. 1 illustrates schematically the use of the invention at hand in a fiber of a fiber bundle.

FIG. 1 illustrates schematically the use of the invention at hand in a fiber (1) of a fiber bundle (2). In data transmission in a customary optical data transmission system the WDM signals ($\lambda_1, \ldots, \lambda_N$) are amplified in a transmission station 3, 4, 5 approximately every 80 to 100 km. A transmission station 3, 4, 5 is used to prepare the signals ($\lambda_1, \ldots, \lambda_N$). The preparation of a signal ($\lambda_1, \ldots, \lambda_N$) can involve an amplification and/or a shaping and/or timing adjustment, so-called "timing". In this context, the transmission stations (#n−1) 3, (#n) 4 and (#n+1) 5 are represented. In general, the individual transmission stations 3, 4, 5 are designed in a similar or identical manner. The structure of the transmission station (#n) 4 is shown in a detailed view with, first of all, only one fiber 1, in which a system according to the invention at hand has been integrated.

The individual transmission stations 3, 4, 5 are connected with each other by at least the optical fiber. By means of these fibers, the data or the information signal ($\lambda_1, \ldots, \lambda_N$) or the information signals ($\lambda_1, \ldots, \lambda_N$) are transmitted. An information signal ($\lambda_1, \ldots, \lambda_N$) can be provided by numerous wavelengths of light, which are transmitted, preferably essentially simultaneously, via a mutual fiber glass 1. In addition to the information signal ($\lambda_1, \ldots, \lambda_N$), the station (#n) 4 receives from the station (#n−1) 3 also a measuring signal $\lambda_{measurement}$. The measuring signal ($\lambda_{measurement}$) has a different wavelength than the information signal ($\lambda_1, \ldots, \lambda_N$). The measuring signal ($\lambda_{measurement}$) is reflected at the wavelength-selective reflector 6, which is assigned to the station (#n) 4, and returns to station (#n−1) 3. The function and processing of the measuring signal ($\lambda_{measurement}$) is illustrated by means of the station (#n 4).

Preferably, the wavelength-selective reflector 6 is designed as a Fiber-Bragg-Grating 6. The measuring signal ($\lambda_{measurement}$) is reflected at the reflector 6. However, the reflector 6 is transparent for the wavelengths of the information signal ($\lambda_1, \ldots, \lambda_N$). The wavelengths are then amplified in an amplifier 7. By way of example, the amplifier 7 is designed as EDFA 7 ("Erbium doped Fiber Amplifier").

In the transmission station 4, after the amplifier 7, a device 8 for coupling and decoupling at least one measuring signal ($\lambda_{measurement}$) has been arranged. Preferably, the device 8 is designed as an ADD/DROP multiplexer. In this connection, it is possible to add a partial signal or several partial signals to a multiplex signal, such as the information signal ($\lambda_1, \ldots, \lambda_N$) and to extract (drop) partial signals from the multiplex signal. Except for these ADD/DROP changes, the received multiplex signal can be essentially retransmitted unchanged. The measuring signal ($\lambda_{measurement}$) is added to the information signal ($\lambda_1, \ldots, \lambda_N$). The measuring signal ($\lambda_{measurement}$) is added to the device 8 via a switch 9, which is preferably designed as a circulator 9.

Figure 3:
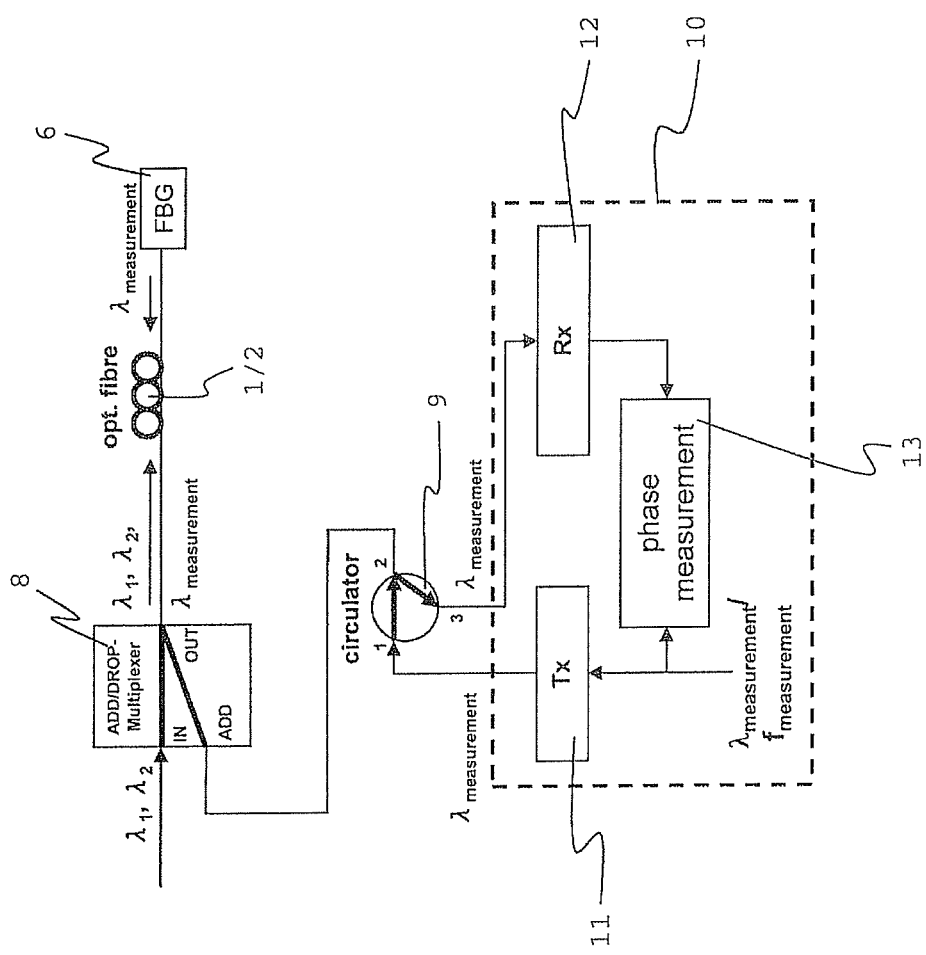
FIG. 3 illustrates schematically the phase measurement.

The information signal ($\lambda_1, \ldots, \lambda_N$) and the measuring signal ($\lambda_{measurement}$) are transmitted together to the station (#n+1) 5 via the optical fiber 1. The measuring signal ($\lambda_{measurement}$) is reflected at the reflector 6, which is assigned to the station (#n+1) 5, preferably designed as Fiber-Bragg-Grating 6, and returns to the station (#n) 4. At the device 8, the measuring signal ($\lambda_{measurement}$) is decoupled again from the line 1, here the fiber 1. The reflected measuring signal ($\lambda_{measurement}$) carries—or the transmitted measuring signal ($\lambda_{measurement}$) together with the reflected measuring signal ($\lambda_{measurement}$) carry—the information over the run time and thus the length of the fiber 1, as well as the dispersion or change of dispersion in the fiber. The information is determined in a measuring unit 10. The measuring signal ($\lambda_{measurement}$) is supplied to the measuring unit 10 by means of a switch 9. Preferably, the information is determined by means of a phase comparison between the transmitted and reflected signal. The following description to FIG. 3 presents the measuring unit 10 and the determination of the information, as well as the generation and direction of the measuring signal ($\lambda_{measurement}$), the component Tx 11 and the component Rx 12, as well as the phase measurement 13.

The information involving the dispersion or the results from the comparison between the coupled and the decoupled measuring signal ($\lambda_{measurement}$) is used to compensate a change of the information signal ($\lambda_1, \ldots, \lambda_N$) resulting from the dispersion or a changed dispersion in the fiber. The objective of the dispersion compensation is to compensate the signal distortion resulting from the path dispersion in such a way that the data transmitted by the transmitter can be received by the receiver in adequate quality. Here the transmitter is, for example, the station (#n) 4. The receiver is here the station (#n+1) 5.

The compensation can take place in a type of backward directed procedure or a type of forward directed procedure or in a combination of both.

In the forward directed variant, the means 14 for compensation can be arranged, for example, between device 8 for coupling and decoupling and before the station (#n+1) 5. In this connection, before being directed on the optical line 1 between the station (#n) 5 and the station (#n+1) 4, the information signal ($\lambda_1, \ldots, \lambda_N$) is prepared and adjusted in such a way that a change of the information signal ($\lambda_1, \ldots, \lambda_N$) resulting from the transmission is essentially compensated. Here the means 14 can be designed, for example, to shape the information signals ($\lambda_1, \ldots, \lambda_N$), especially to temporally stretch and/or compress them. The fine tuning of the dispersion compensation can be performed, for example, with Delay-Line Filters and special Fiber-Bragg-Gratings, the dispersion of which can be adjusted.

In the backward directed variant, the means 14 for compensation can be arranged, for example, in the station (#n+1) 5, preferably after the reflector 6 assigned to the station (#n+1) 5. In this connection, after being directed on the optical line 1 between the station (#n) 4 and the station (#n+1) 5, the information signal ($\lambda_1, \ldots, \lambda_N$) is reconstructed or regenerated. Here the means 14 can be designed, for example, to amplify and/or shape the information signals ($\lambda_1, \ldots, \lambda_N$), especially to temporally stretch and/or compress them. In both variants, the preparation or the reconstruction of the signals ($\lambda_1, \ldots, \lambda_N$) can be performed by using mathematical algorithms.

In future transmission systems higher data rates should be used, in particular of ≧40 Gbit/s, in which the dispersion plays a bigger part than with the data rates of 10 Gbit/s previously used. In a transmission rate of 100 Gbit/s, one bit uses 10 ps. However, the dispersion can result in a broadening of up to 50 ps per bit. An impaired signal ($\lambda_1, \ldots, \lambda_N$) results on the receiving site in detection errors of the transmitted bit pattern. These are specified as bit error rates. The exact knowledge of the dispersion can be used to improve the signal quality in such a way that the required bit error rate can be maintained. The dispersion of fiber 1 can change even during operation, for example, through a change in temperature. Therefore, the system outlined above, preferably also for permanent or quasi continuous dispersion measurements, can make a decisive contribution to the realization of optical transmission systems with data rates of ≧40 Gbit/s. Such systems with 40 and 100 Gbit/s are currently tested.

Figure 2:
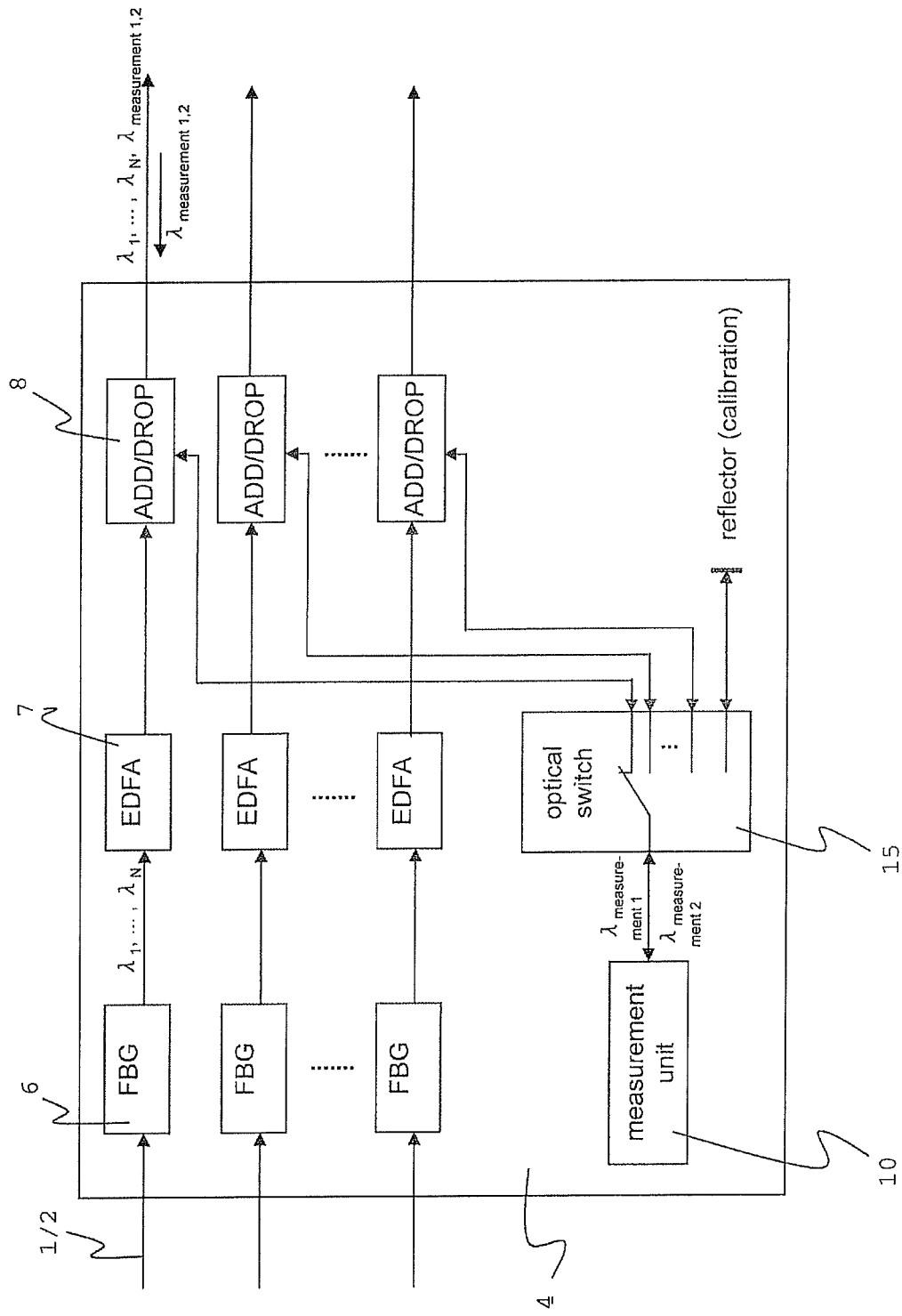
FIG. 2 shows schematically the measurement of the dispersion in several fibers of a fiber bundle.

FIG. 2 schematically shows the measurement of the dispersion in several fibers 1 of a fiber bundle 2. The principal structure essentially corresponds to the structure shown in FIG. 1. For reasons of clarity, the switch 9 is not shown. Contrary to FIG. 1, which shown only one fiber 1, the measuring signal ($\lambda_{measurement}$) is or the measuring signals ($\lambda_{measurement1}$) and ($\lambda_{measurement2}$) are supplied via an optical switch 15 to the fiber 1 or the fibers 1. The fibers 1 are measured individually one after the other. If the measuring unit 10 is designed with respective characteristics, it is also possible to measure several or even all fibers 1 in parallel or simultaneously.

Two measurements of the group run time, preferably one after the other, are performed with different wavelengths of the measuring signals ($\lambda_{measurement1}$) and ($\lambda_{measurement2}$), for example, at $\lambda_{measurement1}$=1548 nm and $\lambda_{measurement2}$=1549 nm. However, the two different wavelengths can also be supplied together. It is possible to calculate directly the dispersion of the fiber 1, preferably in ps/nm, because the dispersion wave shape is essentially known. If the measuring device 10 is designed respectively, it is also possible to perform a parallel measurement in several fibers 1. If two or more wavelengths have to be coupled and/or decoupled, as well as reflected, the device 8 and the reflector 6 have a broader bandwidth.

In order to transmit data rates of 100 Gbit/s, it is necessary to know the dispersion of the path to an accuracy of 1 ps/nm. The dispersion changes, for example, as a result of temperature fluctuations. Since the invention at hand makes it possible to measure the dispersion continuously or quasi continuously, a basic problem of the 100 Gbit/s transmission can be brought under control. The measuring method developed according to the invention makes this possible because the wavelength ($\lambda_{measurement}$) to which the measuring frequency ($f_{measurement}$) is modulated is or can be tuned, allowing for two run time measurements on different wavelengths ($\lambda_{measurement1}$) ($\lambda_{measurement2}$) with a specific wavelength shift. The difference of the measured run times with regard to the wavelength shift represents the dispersion of the transmission path.

FIG. 3 schematically shows the phase measurement and represents a section of FIG. 1. The wavelength of light of the measuring signal ($\lambda_{measurement}$) is initially provided by a laser, which the figure does not show. If the light has not already been modulated internally by the laser with a modulation frequency ($f_{measurement}$), it is modulated with a downstream modulator (also not shown) with a modulation frequency ($f_{measurement}$). For a first, still rough, measurement of the run time, the modulation frequency ($f_{measurement}$) is adjusted to the length of the fiber 1 or the transmission path 1. If the fiber 1 has a length of approximately 100 km, the initial modulation frequency ($f_{measurement}$) lies in a range of approximately 1 kHz. To be able to have more accurate measurements, the initial modulation frequency ($f_{measurement}$) is increased, preferably in discrete steps, especially up to a modulation frequency ($f_{measurement}$) ranging approximately from 100 kHz to 6 GHz. It is also possible to have higher modulation frequencies ($f_{measurement}$), which increases the accuracy of the measurement.

The measuring signal ($\lambda_{measurement}$) is divided and, on the one hand, supplied to the coupling device 8 via the switch 9 and, on the other hand, it is supplied to the device 13 for measuring the phase. The feed line of the switch 9 is illustrated by the device 11 shown for transmission Tx or by the transmission device 11. There it is also possible to prepare, or adjust, as for instance to amplify, the measuring signal ($\lambda_{measurement}$).

After the process of decoupling, the reflected signal ($\lambda_{measurement}$) is supplied to the receiving device Rx 12 via the switch 9. Also there it is possible, for example, to prepare or adjust, as for instance to amplify, the reflected measuring signal ($\lambda_{measurement}$). The reflected measuring signal ($\lambda_{measurement}$) is also supplied to the device 13 for measuring the phase. For example, the measurement of the phase can be performed by comparing the transmitted and reflected signal by means of a phase comparator. The dispersion of the fiber 1, in turn, can be determined via the run time. Preferably, the previously mentioned components are part of the measuring unit 10. An exemplary embodiment for a part of the measuring unit 10 or the device 13 is a so-called network analyzer 10.

It would be obvious to an expert that the described embodiments are to be viewed as examples. The invention is not restricted to these examples but can be varied in different ways without giving up the spirit of the invention. Characteristics of individual embodiments and the characteristics mentioned in the general part of the description can each be combined among or with each other.

REFERENCE LIST

1 Fiber or line
2 Fiber bundle or transmission path
3 Transmission station (#n−1)
4 Transmission station (#n)
5 Transmission station (#n+1)
6 Reflector or Fiber-Bragg-Grating
7 Amplifier or EDFA
8 Device for coupling and/or decoupling the measuring signal or ADD/DROP multiplexer
9 Switch or circulator
10 Measuring device or measuring unit
11 Device for transmission or transmission device
12 Receiving device
13 Device for measuring the phase, means for comparing the signals and/or for determining the dispersion
14 Means for compensating, especially the dispersion
15 Optical switch
($\lambda_1, \ldots, \lambda_N$) Information signal
($\lambda_{measurement}$) Measuring signal (optical signal which is modulated with the measuring frequency $f_{measurement}$)
($\lambda_{measurement1}$) Measuring signal with a first optical wavelength
($\lambda_{measurement2}$) Measuring signal with a second optical wavelength which differs from the first measuring signal
($f_{measurement}$) Modulation frequency of the measuring signal (electrical signal)

The invention claimed is:

1. A method for transmitting data through an optical transmission system from a first place (4) to a second place (5), wherein said transmission system has at least a light generating sender, a transmission path (2) having at least one fiber (1) and one receiver, and comprises the following procedural steps:
   Generating a measuring signal ($\lambda_{measurement}$) of at least one wavelength which differs from the wavelengths of a data signal ($\lambda_1, \ldots, \lambda_N$) that includes the data to be transmitted,
   Coupling the measuring signal ($\lambda_{measurement}$) into at least one fiber (1) of the optical transmission system,
   Providing a reflector (6) for wavelength-selective reflection, allowing the measuring signal ($\lambda_{measurement}$) to be reflected after having passed through a section of the fiber (1),
   Decoupling the reflected measuring signal ($\lambda_{measurement}$) from the fiber (1),
   Comparing the coupled measuring signal ($\lambda_{measurement}$) and the decoupled reflected measuring signal ($\lambda_{measurement}$), and
   at least determining the dispersion in the fiber by comparing the coupled measuring signal ($\lambda_{measurement}$) and the decoupled reflected measuring signal ($\lambda_{measurement}$), wherein an initial modulation frequency ($f_{measurement}$) is adapted to a boundary condition of $1/f_{measurement}$ larger than approximately twice the run time of the measuring signal ($\lambda_{measurement}$).

2. A method according to claim 1, characterized by compensation of the change of the data signal ($\lambda_1, \ldots, \lambda_N$) that occurred at least as a result of the dispersion taking place in the fiber (1), taking account of the comparison in such a way that the data included in the data signal ($\lambda_1, \ldots, \lambda_N$) can be used.

3. A method according to claim 1, characterized in that the measuring signal ($\lambda_{measurement}$) is provided with at least two different wavelengths ($\lambda_{measurement1}$, $\lambda_{measurement2}$), at least for a first measurement of the fiber (1).

4. A method according to claim 1, characterized in that the dispersion is determined from the run times of the different wavelengths of the measuring signal ($\lambda_{measurement}$).

5. A method according to claim 1, characterized in that the phase of the coupled measuring signal ($\lambda_{measurement}$) is compared with the phase of the decoupled measuring signal ($\lambda_{measurement}$).

6. A method according to claim 1, characterized in that the run time of the measuring signal ($\lambda_{measurement}$) in the fiber (1) is determined.

7. A method according to claim 2, characterized in that, before coupling into the fiber (1) of the optical transmission system, the data signal ($\lambda_1, \ldots, \lambda_N$) is adjusted in such a way that a change of the data signal ($\lambda_1, \ldots, \lambda_N$) resulting from the transmission is essentially compensated.

8. A method according to claim 2, characterized in that, after the transmission via the fiber (1), the data signal ($\lambda_1, \ldots, \lambda_N$) is adjusted in such a way that a change of the data signal ($\lambda_1, \ldots, \lambda_N$) resulting from the transmission is essentially compensated.

9. A method according to claim 1, wherein the modulation frequency ($f_{measurement}$) of the measuring signal ($\lambda_{measurement}$) is essentially kept constant.

10. A system for integrating in an optical data transmission system, which has at least a light generating transmitter, a transmission path having at least one fiber and one receiver, for compensating the dispersion, comprising the following components:
   A device (11) for providing a measuring signal ($\lambda_{measurement}$) of at least one wavelength which differs from the wavelengths of a data signal ($\lambda_1, \ldots, \lambda_N$) that includes the data to be transmitted,
   A coupling device (8) for coupling the measuring signal ($\lambda_{measurement}$) into at least one fiber (1) of the optical transmission system,
   A reflector (6) for wavelength-selective reflection, allowing the measuring signal ($\lambda_{measurement}$) to be reflected after passing through the fiber portion (1),
   A coupling device (8) for decoupling the reflected measuring signal ($\lambda_{measurement}$) from the fiber (1),
   A receiving device (12) for receiving the decoupled reflected measuring signal ($\lambda_{measurement}$),
   Means (13) for comparing the coupled measuring signal ($\lambda_{measurement}$) and the decoupled reflected measuring signal ($\lambda_{measurement}$) and for determining the dispersion in the fiber,
   wherein an initial modulation frequency ($f_{measurement}$) is adapted to a boundary condition of $1/f_{measurement}$ larger than approximately twice the run time of the measuring signal ($\lambda_{measurement}$).

11. A system according to claim 10, characterized by means (14) for compensating the change of the data signal ($\lambda_1, \ldots, \lambda_N$) that occurred at least as a result of the dispersion taking place in the fiber, taking account of the comparison in such a way that the data included in the data signal ($\lambda_1, \ldots, \lambda_N$) can be used.

12. A system according to claim 10, characterized in that the device (11) for providing the measuring signal ($\lambda_{measurement1}$, $\lambda_{measurement2}$) is designed with at least two different wavelengths.

13. A system according to claim 10, characterized in that the reflector (6) comprises a Fiber-Bragg-Grating (6).

14. A system according to claim 10, characterized in that the coupling device (8) for coupling the measuring signal ($\lambda_{measurement}$) and the coupling device (8) for decoupling the measuring signal ($\lambda_{measurement}$) are provided in one component (8).

15. A system according to claim 10, characterized in that the means (13) for comparison are designed to compare the phase of the coupled measuring signal ($\lambda_{measurement}$) with the phase of the decoupled measuring signal ($\lambda_{measurement}$).

16. A system according to claim 10, characterized in that the means (13) for comparison comprise a network analyzer (10).

17. A system according to claim 11, characterized in that the means (14) for compensating are arranged in beam direction behind the coupling device (8) for coupling and/or behind the coupling device (8) for decoupling.

18. An optical data transmission system having at least a system according to claim 10 included in a transmission station (3, 4, 5).

* * * * *